US011972332B2

(12) United States Patent
Baum et al.

(10) Patent No.: US 11,972,332 B2
(45) Date of Patent: *Apr. 30, 2024

(54) PROVIDING SEMANTIC MEANING TO TELEMETRY DATA TO CREATE INSIGHTS

(71) Applicant: Microsoft Technology Licensing, LLC, Redmond, WA (US)

(72) Inventors: Shloma Baum, Monroe, NY (US); Jimmy Chih-Hsun Yu, Bellevue, WA (US); John Te-Jui Sheu, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,556

(22) Filed: Feb. 13, 2023

(65) Prior Publication Data
US 2023/0196209 A1    Jun. 22, 2023

Related U.S. Application Data

(63) Continuation of application No. 16/687,581, filed on Nov. 18, 2019, now Pat. No. 11,605,023.
(Continued)

(51) Int. Cl.
*G06F 21/00* (2013.01)
*G06N 20/00* (2019.01)
(Continued)

(52) U.S. Cl.
CPC ............. *G06N 20/00* (2019.01); *G06F 9/451* (2018.02); *H04L 67/12* (2013.01)

(58) Field of Classification Search
CPC .......... G06N 20/00; G06N 5/04; G06F 9/451; H04L 67/12; G06Q 10/20; G06Q 10/06
See application file for complete search history.

(56) References Cited

U.S. PATENT DOCUMENTS

| 10,324,773 B2* | 6/2019 | Wing ..................... G06Q 10/10 |
| 2015/0112925 A1* | 4/2015 | Lai ...................... G06F 16/2322 707/610 |

(Continued)

OTHER PUBLICATIONS

Department Of Defense Zero Trust Reference Architecture. Version 2.0. Jul. 2022. chrome-extension://efaidnbmnnnibpcajpcglclefindmkaj/ https://dodcio.defense.gov/Portals/0/Documents/Library/(U)ZT_RA_ v2.0(U)_Sep22.pdf (Year: 2022).*

*Primary Examiner* — Kendall Dolly
(74) *Attorney, Agent, or Firm* — Barta Jones, PLLC

(57) ABSTRACT

The disclosure derives insight from telemetry data by receiving telemetry data; parsing the received telemetry data to identify properties, and mapping the identified properties to a set of identified tags based at least on a tag library. Based at least on the mapping, the disclosure generates insight data and a report for the telemetry data. In this manner, the disclosure adds structure to data, thereby providing semantic meaning to internet of things (IoT) telemetry data, regardless of the device class or manufacturer. This, in turn, automatically creates applicable insights. Insights are available with a core tag taxonomy, which can be extended and customized. By applying the tags, a user obtains immediate insights related to usage, performance, and health of a monitored product or service.

20 Claims, 12 Drawing Sheets

Related U.S. Application Data

(60) Provisional application No. 62/902,378, filed on Sep. 18, 2019.

(51) Int. Cl.
  *G06F 9/451* (2018.01)
  *H04L 67/12* (2022.01)

(56) References Cited

U.S. PATENT DOCUMENTS

2019/0005005 A1\* 1/2019 Moore .................. G06F 3/0486
2019/0042988 A1\* 2/2019 Brown .................. G06N 5/022

\* cited by examiner

PROVIDING SEMANTIC MEANING TO TELEMETRY DATA TO CREATE INSIGHTS

CROSS-REFERENCE TO RELATED APPLICATION

This application claims the benefit of U.S. Non-Provisional patent application Ser. No. 16/687,581, filed Nov. 18, 2019, entitled "Providing Semantic Meaning to Telemetry Data to Create Insights", which claims priority to U.S. Provisional Patent Application No. 62/902,378, filed Sep. 18, 2019, entitled "Providing Semantic Meaning to Telemetry Data to Create Insights", the entireties of both which are hereby incorporated by reference herein.

BACKGROUND

With the explosion of products and services across multiple industries being digitally connected and emitting data signals on use, performance and health, large amounts of data are collected as telemetry from deployed sensors (e.g., internet of things (IoT) sensors and devices). Products can now be engineered and continuously improved using real-time data regarding real-world product operations.

Unfortunately, IoT data is often unstructured, and even data that has some structure is in a proprietary format that is typically specific to the sensor, monitored device, and/or manufacturer. This is a result of the diversity of manufacturers and connected product types, and the absence of a standard schema defining a structure and model for the telemetry. This limits the usefulness of the data, as organizations struggle to derive value and make sense from the sheer volume of data in their possession. Many organizations lack sufficient analytics capabilities to take full advantage of IoT data. As even greater amounts of data will be collected in the future, without a solution to facilitate interpretation, much of the coming data will be similarly under-utilized.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to solutions for deriving insight from telemetry data that include: receiving telemetry data; parsing the received telemetry data to identify properties; mapping the identified properties to a set of identified semantic tags, based at least on a tag library, wherein the tag library comprises predetermined relationships of tags with properties; based at least on the mapping of the identified properties to the set of identified tags, generating first insight data for the telemetry data; and generating a report of the insight data.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
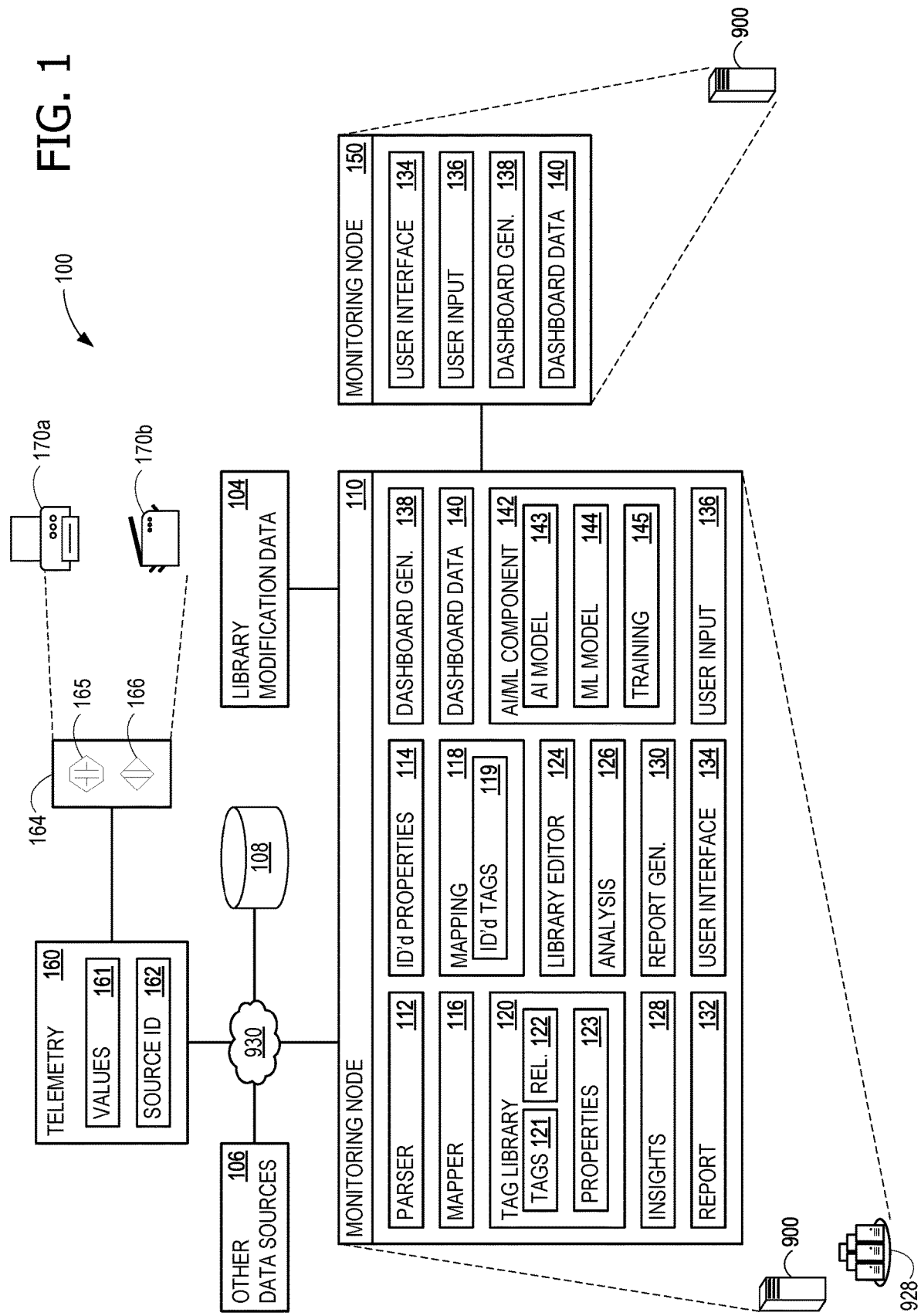
FIG. 1 illustrates an arrangement that advantageously derives insight from telemetry data.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Data insights represent information that becomes available when values are provided for metrics, such as by revealing trends buried within data. By leveraging the disclosure, for example by applying tags, a user obtains immediate insights related to usage, performance, health, and other insight categories for a monitored product or service. Messy signals can be converted into rich insights using the disclosed tagging experience, harnessing structure to bring internet of things (IoT) and business data together to provide meaning.

Embodiments described herein provide solutions for deriving insight from telemetry data that include: receiving telemetry data; parsing the received telemetry data to identify properties; mapping the identified properties to a set of identified tags, based at least on a tag library, wherein the tag library comprises predetermined relationships of tags with properties; based at least on the mapping of the identified properties to the set of identified tags, generating insight data for the telemetry data; and generating a first report of the insight data. A report is an output data set, representing at least a portion of the derived insight, that provides a tangible result with value to the users. Disclosed solutions add structure to unstructured data, thereby providing semantic meaning to IoT telemetry, regardless of the device class or manufacturer. This, in turn, automatically creates applicable insights. Insights are available with a core tag taxonomy, which can be extended and customized. By applying the tags, a user obtains immediate insights related to usage, performance, and health of a monitored product or service. Insights are applicable for usage, performance, and health monitoring, but are sufficiently flexible to extend to new categories. In some examples, as semantic tags are updated, insights change dynamically.

The disclosure introduces a first-in-kind list of semantic tags applicable across a variety of products, to create dynamic insights. The tags can be applied to properties of data received from a wide variety of products and services, such as differing classes of appliances (e.g., office equipment such as printers and copiers, household items such as coffee makers and dishwashers, industrial machinery, and others), and even software applications.

Aspects of the disclosure operate in an unconventional way to tag unstructured data with semantic meaning. For example, the disclosure provides a way to easily provide semantic meaning to IoT telemetry data of a connected device, product, or service, regardless of the monitored item's class and/or manufacturer. This then enables automatic generation of applicable insights, without forcing users to change the structure of their telemetry into a specific schema. The semantic tags may be applied and updated at any time and for some examples, the insights change dynamically.

Aspects of the disclosure can turn large amounts of observational data into compelling insights in real-time, to fundamentally address challenges of users (e.g., product manufacturers). Aspects of the disclosure may be generalized to other types of unstructured data, beyond sensor telemetry data. Some examples provide immediate value by offering predefined product templates that are able to generate out-of-box insights on product usage, performance and health for many products. The disclosure is able to bring together the worlds of observational data with the wealth of product transactional data, thereby unlocking actionable insights leading to the transformation of product innovation and business-model transformation. Aspects of the disclosure provide, but are not limited to: quick time-to-value, out-of-the-box artificial intelligence (AI) and/or machine learning (ML) insights, massive resilience and planet-scale, and simple start-up with performance improvement with ongoing usage.

Alternatively or in addition to providing insights on top of the observation data itself, the disclosure adds the ability to infuse observational data with business objects by introducing a mapping service that enables powerful mapping and conflation capabilities. The mapping service allows the registration of adapters that power the heavy lifting, in a user-friendly manner, thereby improving the human-machine interface. The disclosure includes an out-of-the-box adapter that allows mapping between device telemetry to products and devices, with knowledge of the common data model (CDM) schema structure. This adapter lays the foundation for additional adapters connecting to various third party external systems. The ability to map observational data to business data enables additional downstream integration scenarios between the disclosure platform, the CDM, and various business process applications.

Aspects of the disclosure provide improvements in the human-machine interface by leveraging predetermined relationships of tags with properties to map identified properties (in unstructured data) to tags, thereby generating insight for data. Aspects of the disclosure provide improved computing, storage, and/or network resource allocation by parsing the received telemetry data to identify properties in telemetry data to enable mapping the identified properties to tags using an AI model.

FIG. 1 illustrates an arrangement 100 that advantageously derives insight from telemetry data. A monitoring node 110 is communicatively coupled to network 930 and is operable to receive telemetry data 160 from a set of sensors 164. Set of sensors 164 is illustrated as having two sensors 165 and 166, although in some examples, different numbers of sensors are used. Sensors 165 and 166 monitor usage, performance health, and other operational aspects of devices 170a and 170b which, in some examples, comprise IoT devices. Thus, set of sensors 164 is operable to monitor a device, arrangement of devices, or service, as illustrated.

Telemetry data 160 comprises sensor data from set of sensors 164, and may take the form of telemetry messages. As illustrated, telemetry data 160 includes both data values 161 and source ID 162 that identifies a source of at least a portion of telemetry data 160 (e.g., one of devices 170a and 170b). Network 930 is communicatively coupled to set of sensors 164, and can include a wired network or wireless network or both. For example, an office copier machine may be physically connected to the internet through a network cable and/or a wireless connection (e.g., WiFi) to send telemetry data.

Monitoring node 110 is also able to receive telemetry data from other data sources 106, which may include other sensors, and a data store 108, which may house data from set of sensors 164 and/or other data sources 106 until monitoring node 110 is able to retrieve it. Monitoring node 110 may be a computing device 900 or cloud resource 928, which are described in further detail in relation to FIG. 9. Thus, monitoring node 110 includes at least one processor and a memory. In some examples, the various components 112-145 shown for monitoring node 110 within memory 912 and form various portions of data 912a and instructions 912b of FIG. 9.

Monitoring node 110 has a parser 112 to parse the received telemetry data 160 to identify properties 114 within telemetry data 160. A mapper 116 maps the identified properties 114 to a set of identified tags 119, based at least on a tag library 120, wherein the tag library 120 comprises predetermined relationships 122 of tags 121 with properties 123. To accomplish this, mapper 116 generates a mapping 118 of identified properties 114 to the set of identified tags 119 (which are pulled from tags 121 within tag library 120, based on relationships 122). In some examples, tags 121 are hierarchical. Some examples of mapper 116 use a customizable rules engine. A library editor 124 is used to generate or modify tag library 120. In some examples, generating or modifying tag library 120 includes providing a first list of tags 121; receiving a list of properties 123; and relating at least a portion of the first list of tags 121 with at least a portion of the list of properties 123. In some examples, relating at least a portion of the first list of tags 121 with at least a portion of the list of properties 123 includes assigning at least one tag within the first list of tags 121 to at least one property within the list of properties 123 with an AI model 143. In some examples, generating or modifying tag library 120 includes assigning at least one tag within the first list of tags 121 to at least one property within the list of properties 123 based at least on identifying the source (e.g., source ID 162) of at least a portion of telemetry data 160. In some examples, relating at least a portion of the first list of tags 121 with at least a portion of the list of properties 123 comprises receiving user input 136 assigning at least one tag within the first list of tags 121 to at least one property within the list of properties 123.

Figure 6A:
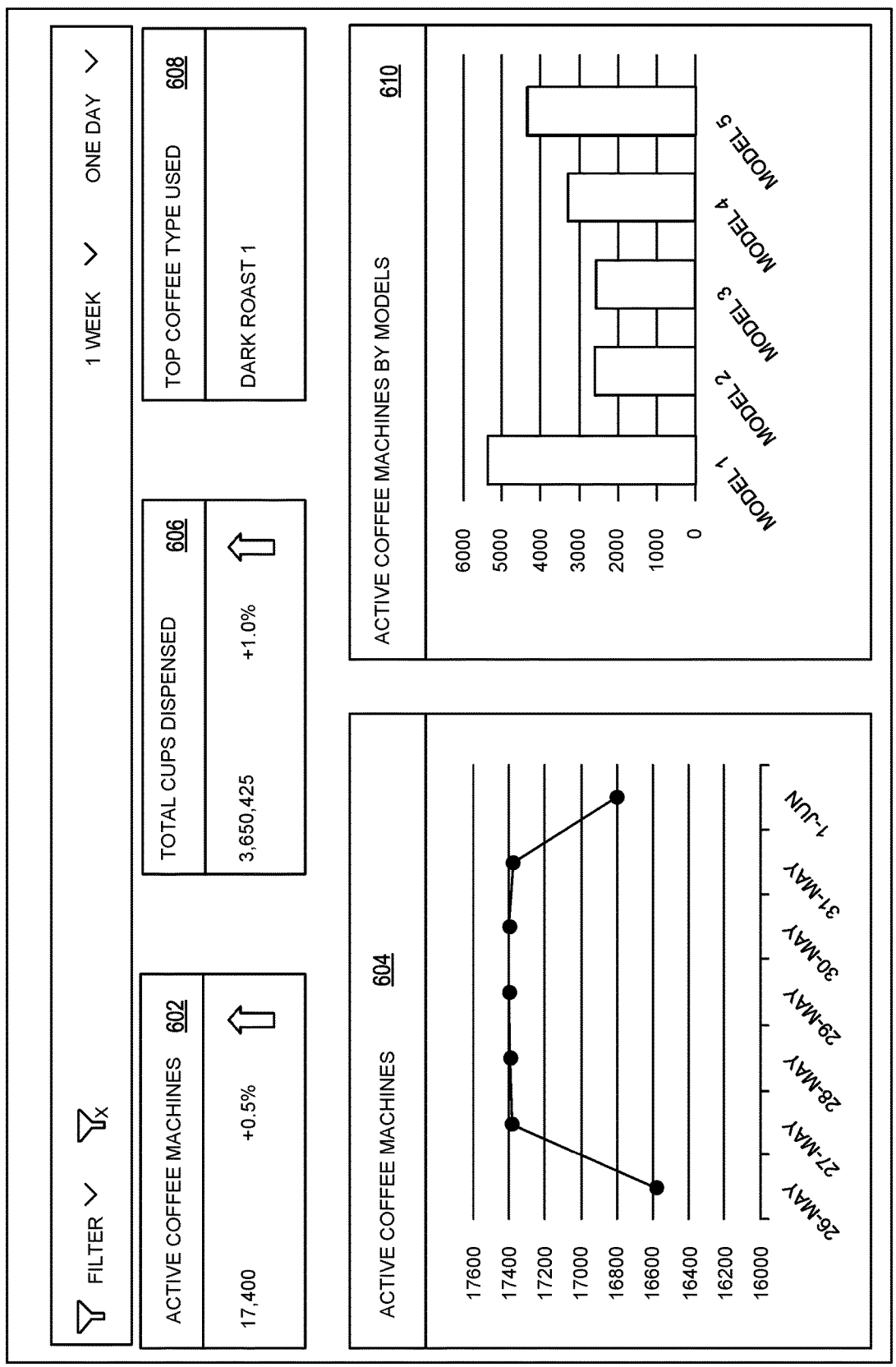
FIGS. 6A and 6B illustrate exemplary reports resulting from deriving insight from telemetry data.
Figure 6B:
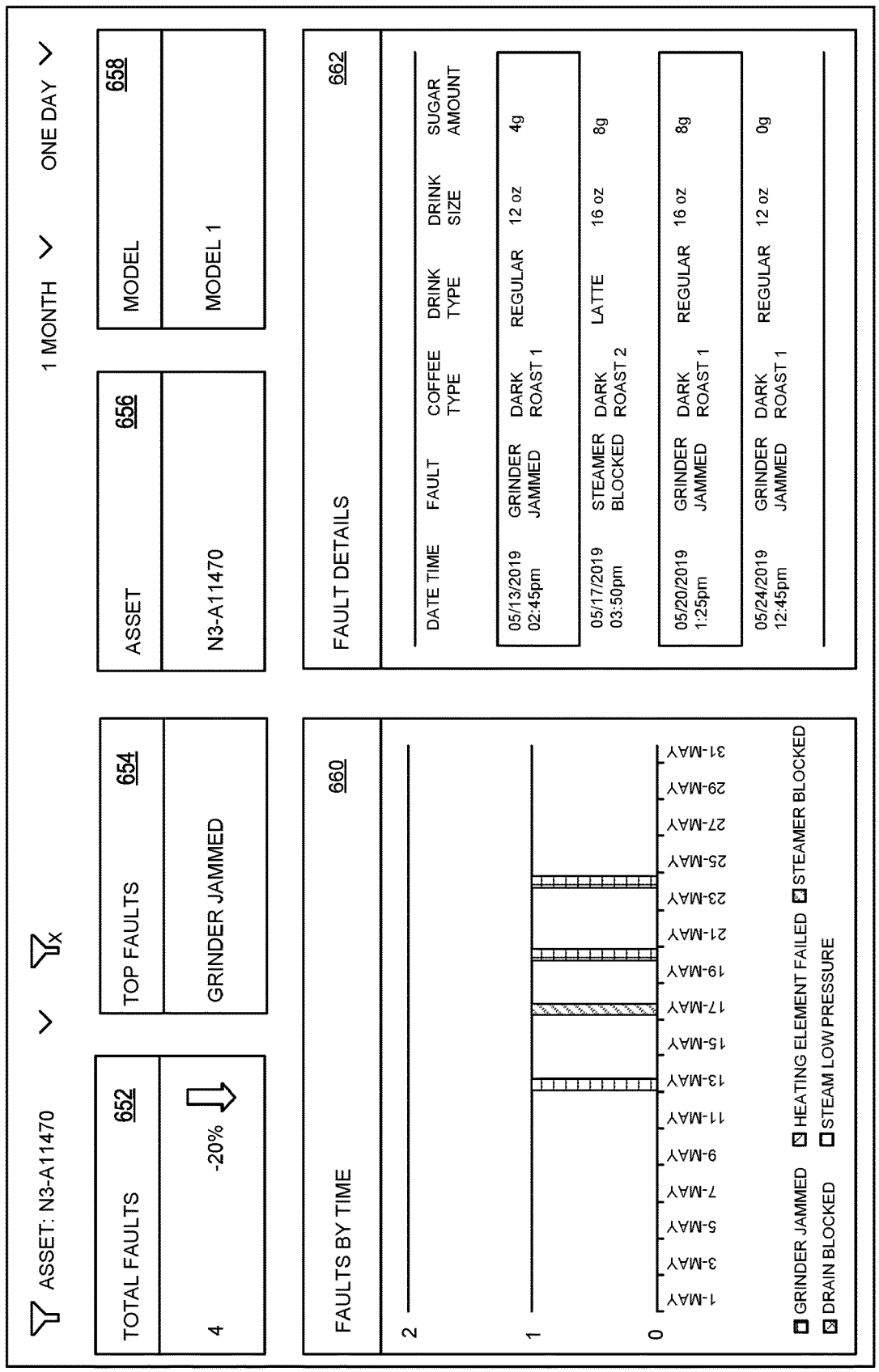

Based at least on mapping 118 of identified properties 114 to set of identified tags 119, an analysis component 126 generates insight data 128 for telemetry data 160. In some examples, generating insight data 128 for telemetry data 160 includes generating data relating to usage, performance, or health of a monitored device (e.g., one of devices 170a and 170b), arrangement of devices, or service. A report generator 130 then generates a report 132 of insight data 128. A report is an output data set, representing at least a portion of the derived insight, that provides a tangible result with value to the users. Example reports are shown in FIGS. 6A and 6B. In some examples, generating report 132 of insight data 128 includes outputting at least a portion of insight data 128 to a dashboard, for example a dashboard 200, shown in FIG. 2. This operation uses a dashboard generator 138 that produces dashboard data 140 for display, for example on a computer display monitor.

A user interface (UI) 134 is used for showing information to users and accepting user input 136, for example to edit (e.g., generate or modify) tag library 120. In some examples, generating or modifying the tag library includes providing UI 134 showing tags 121 and properties 123 to a user, to enable editing via user input 136. In some examples, monitoring node 110 is further operable to receive modification data 104 for tag library 120. Portions of modification data 104 may be provided, for example by a user and/or a manufacturer of one of devices 170a and 170b, in order to extend or customize tag library 120. Such extension and customization is described in further detail in relation to FIG. 5. Monitoring node is also operable to modify tag library 120, based at least on the modification data 104 for tag library 120.

Additionally, an AI and ML component 142 ("AI/ML component 142") is also able to modify tag library 120. In some examples, AI/ML component 142 assigns at least one tag within list of tags 121 to at least one property within the list of properties 123 with AI model 143 or an ML model 144. In some examples, AI/ML component 142 further trains AI model 143 and/or ML model 144 using previously determined relationships of tags 121 with properties 123. In some examples, AI/ML component 142 assists one or more of parser 112, mapper 116, analysis component 126, and report generator 130 in performing the above-described functions for each component. In some examples, a user verifies the work of AI/ML component 142, such as modifying tag library 120, or performing parsing, mapping, analysis, or generating reports.

In some examples, based at least on modifying tag library 120, monitoring node 110 then generates follow-up insight data 128 for telemetry data 160. This leverages the new information within tag library 120. In some examples, monitoring node 110 further generate a follow-up report 132 for the follow-up insight data 128. In some examples, this is automatic, and in some examples, this occurs each time tag library 120 is updated.

A second monitoring node 150 may be used as a user terminal to display insights generated by monitoring node 110, and may be co-located or remote from monitoring node 110. Similarly with monitoring node 110, second monitoring node 150 may be a computing device 900 or a cloud resource 928. As illustrated, second monitoring node 150 is communicatively coupled to monitoring node 110, and is operable to receive report 132 and generate a dashboard display, based at least on report 132. As illustrated, second monitoring node 150 has its own copies of UI 134, user input 136, dashboard generator 138, and dashboard data 140, although the configuration of second monitoring node 150 may vary widely based on operational needs. In some examples, second monitoring node 150 also generates insight data, similarly as monitoring node 110.

Figure 2:
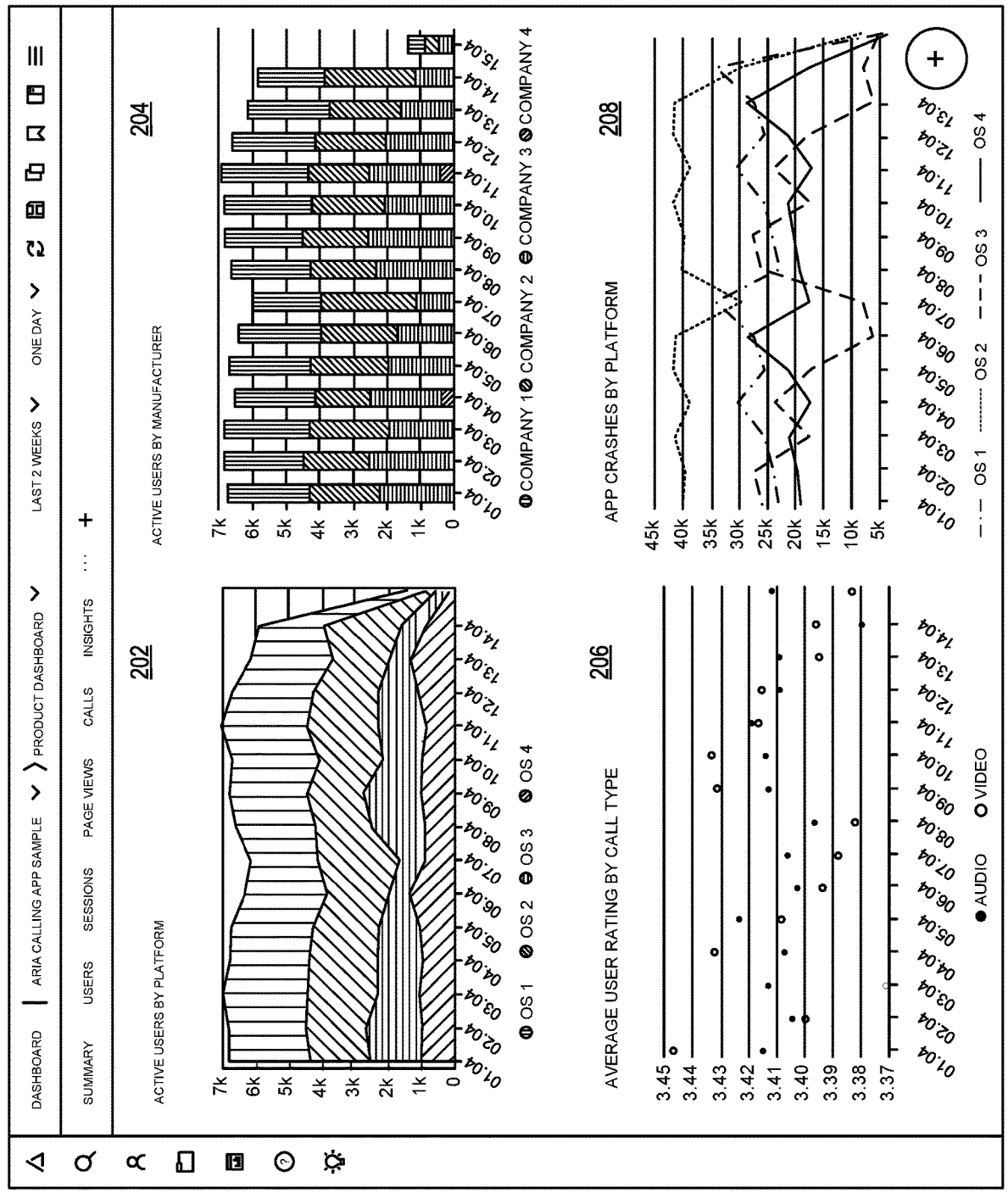
FIG. 2 illustrates an exemplary dashboard display produced by some examples of the arrangement of FIG. 1.

FIG. 2 illustrates an exemplary dashboard 200 produced by dashboard generator 138 in monitoring node 110 or second monitoring node 150. Dashboard 200 shows four graphical displays 202-208, although it should be understood that some examples display a different number. Graphical display 202 shows the number of active users of a monitored application (app) over time. The app being monitored is a software product. Graphical display 204 shows the number of active users by the manufacturer of the device (e.g., a smartphone) that is running the monitored app. Graphical display 206 shows user satisfaction data, and graphical display 208 shows information related to crashes of the monitored app. It should be understood that a wide range of different dashboard displays are possible, and customizable within dashboard generator 138.

Figure 3:
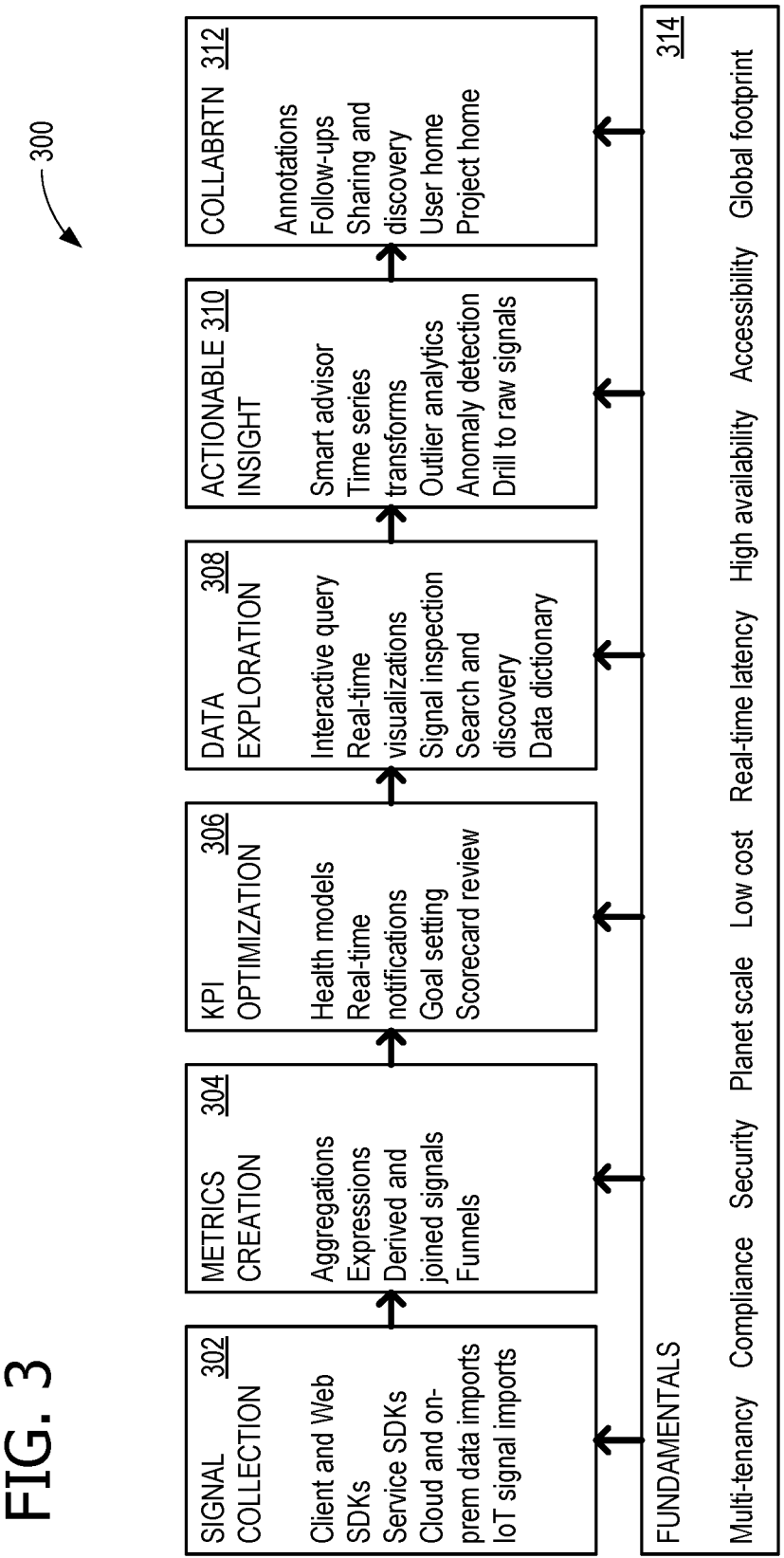
FIG. 3 illustrates a telemetry lifecycle associated with some examples of the arrangement of FIG. 1.

FIG. 3 illustrates a telemetry lifecycle associated with some examples of the arrangement 100. With connected products being so ubiquitous, and with various sensors accompanying those products being commonplace, companies now have digital representations of their physical products with data captures such as current parameter values (e.g., motor speed, pressure levels, etc.) and state changes (e.g., lid opened/closed, motor idle/running, engine started/stopped, etc.); and also sensor-enabled data captures such as temperature, humidity, vibration, and many others. However, as noted above, the data is typically unstructured. For example, temperature sensors from different manufacturers may identify temperature as "temperature," "temp," or "tmp." Additionally, not all sensors produce the same amount or data, either by variation (e.g., temperature only, versus temperature, humidity, and wind speed) or temporally. For example, wired sensors may have fewer power and bandwidth limitations than battery-operated wireless sensors that send terse telemetry messages relatively infrequently.

The illustrated stages of telemetry flow 300 include signal collection stage 302, metrics creation stage 304, key performance indicator (KPI) optimization stage 306, data exploration stage 308, actionable insight stage 310, and collaboration stage 312. All of stages 302-312 are built on process fundamentals 314. During signal collection stage 302, a mapping service (e.g., mapper 116 of FIG. 1) may leverage AI, ML, and a customizable rules engine, to intelligently infer and apply the proper semantic meaning to the data being ingested.

Figure 4A:
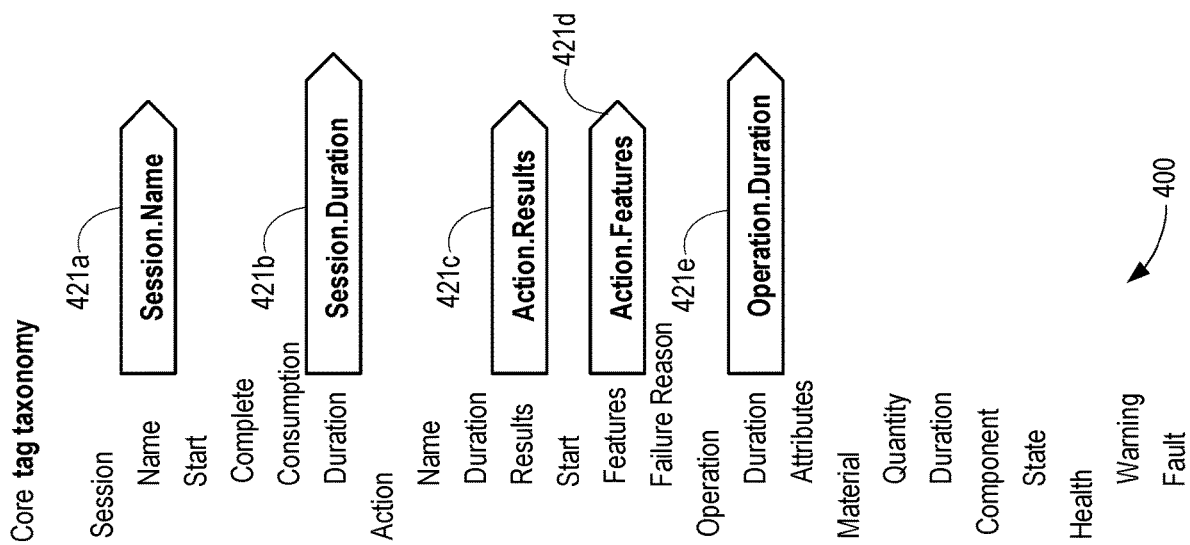
FIGS. 4A and 4B illustrate exemplary stages of deriving insight from telemetry data.
Figure 4B:
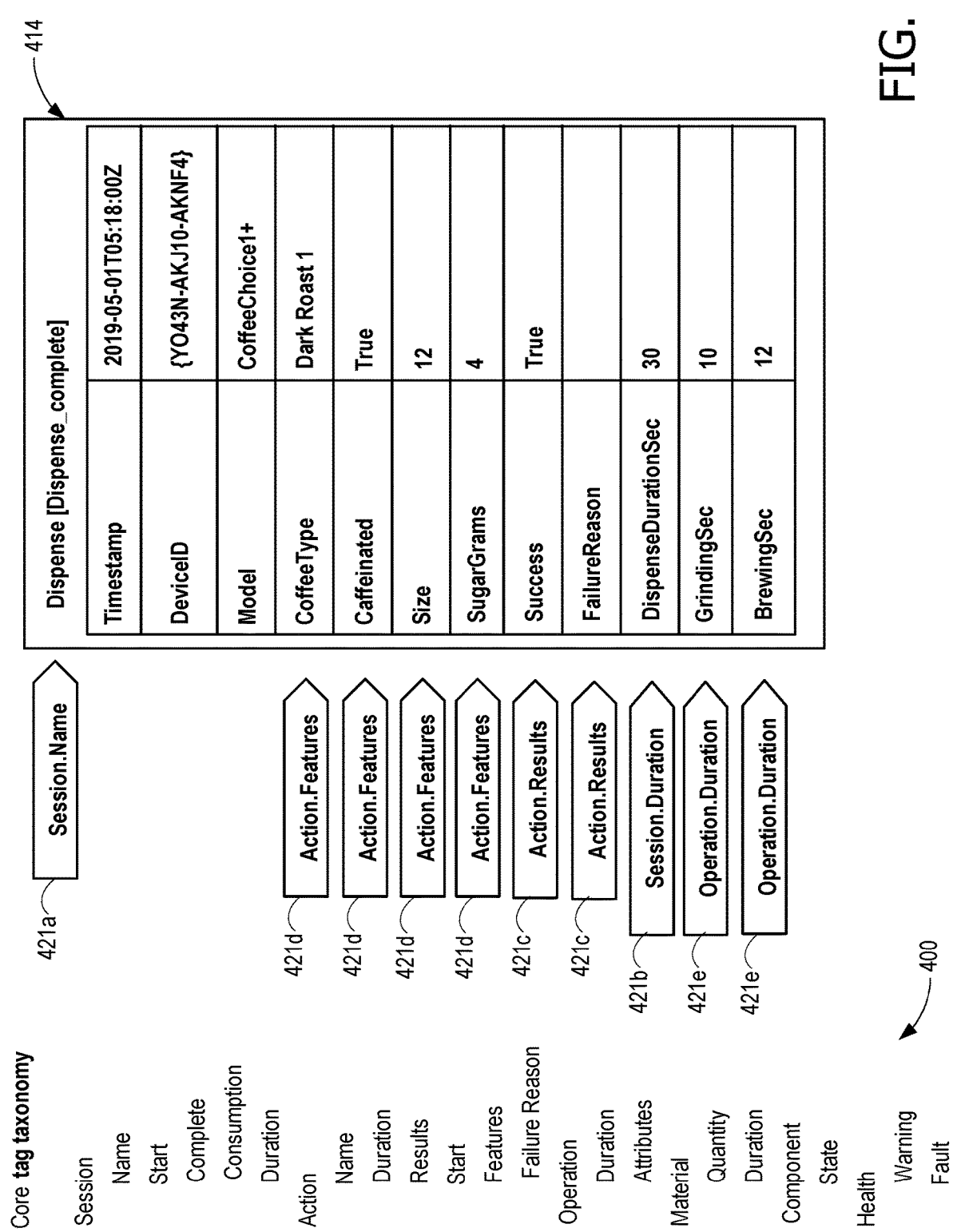

FIGS. 4A and 4B illustrate exemplary stages of deriving insight from telemetry data. FIG. 4A shows a core taxonomy 400 that is to be used to map a set of tags 421a-421e with a list of identified properties 414. The mapping may be considered as properties to tags, or tags to properties. The examples shown in FIGS. 4A and 4B are for a coffee maker. FIG. 4B shows the mapping, indicating that some tags are applied to multiple properties. For example, Session.Name 421a is applied to "Dispense," whereas Action.Features 421d is applied to "coffee Type," "Caffeinated," "Size," and "SugarGrams." Example insights for appliances such as coffee makers may include: (1) Active Assets Count: Total Active, By Day of Week, By Time of Day, By Model, Avg time in-use by day, Dispense Count by Model; (2) Dispense Session: Average Dispense Duration, Duration by Model; (3) Dispense Features: Dispense by CoffeeType, Dispense by Caffeinated, Dispense by Size, Dispense by SugarGrams; (4) Dispense Results: Dispense by Success/Failure, Failures by Reason for Failure; and (5) Operations: GrindingSec Duration, BrewingSec Duration.

Figure 4C:
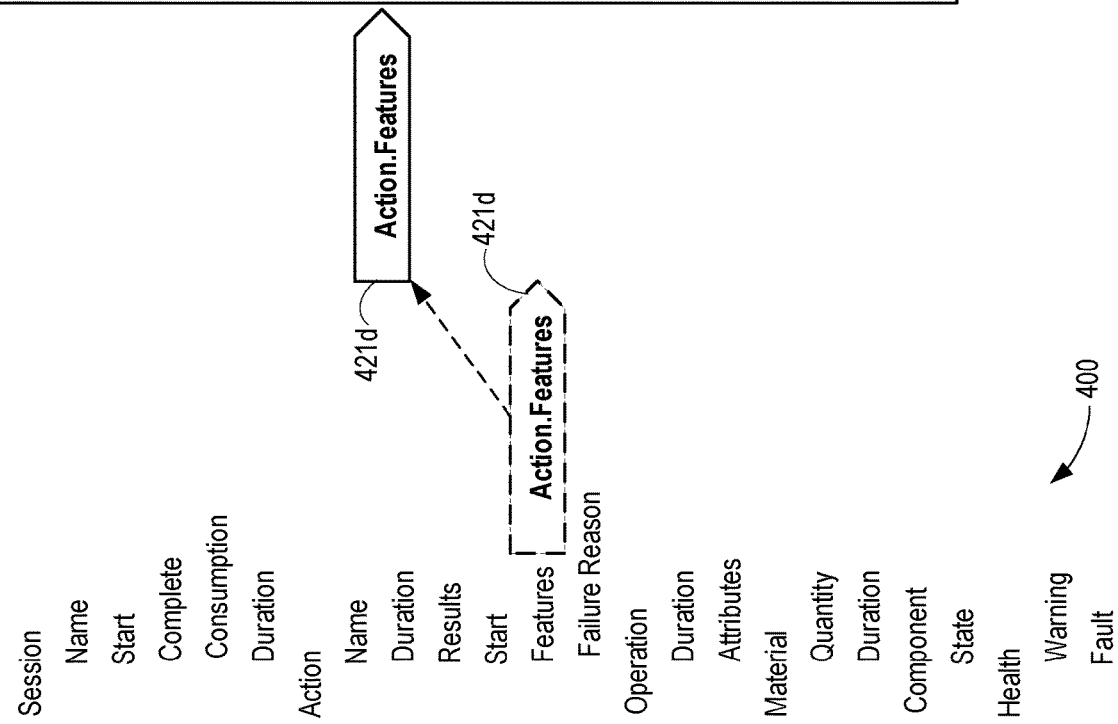
FIG. 4C illustrates a tagging experience example when a user input transitions from the state shown in FIG. 4A to the state shown in FIG. 4B.

FIG. 4C illustrates a tagging experience example when a user input transitions from the state shown in FIG. 4A to the state shown in FIG. 4B. For example, tag 421d is moved by a user, in a drag and drop operation, from Action: Features taxonomy category to the "Caffeinated" property. Other assignment options are possible, leveraging user input, such as "inline" tag assignment.

Some examples furnish an out-of-the-box capability that provides immediate value to a user. While the core constructs may be dynamic and may be refined over time, an example out-of-the-box list includes: (1) Session: Name, Start Time, Duration, Duration unit; (2) Event Activity: Name, Start Time, Duration, Duration unit, Usage, Success, Result Code, Result Detail, Feature, Consumed, Replenished, Source; (3) Observation (Heartbeat): Material Remaining, Activity State, Health Status, Health Code, Health Message, Environmental State; and (4) Context: User Identifier, User Attribute, Asset Identifier, Asset Attribute, Product Identifier, Product Attribute. In some examples, the tags are hierarchical, and so some of these example core constructs have lower layers. Other core constructs at a more focused level, for some examples, are also possible, including: (1) Property Types: fuel level, energy, lighting, environment (air, heat, cool, pressure, water, temp, humidity), state, and motion; (2) Measurement Types: usage, performance, and health; and (3) Action Type: on/off and start/stop.

Complex products with multiple components can significantly increase the difficulty in troubleshooting performance problems. For example, even if the various versions of "temperature," "temp," or "tmp" can all be correctly resolved to temperature, if a monitored thermostat shows a temperature value above an alarm threshold, it can be caused by a myriad of factors, such as a compressor failure, a blower failure, a high thermostat setting, and many others. If data is siloed, the full value of sensor telemetry, from the various components of a complex system being disconnected, is not realized for troubleshooting and identifying the cause of an alarm condition. Aspects of the disclosure tag data to enable ascertaining proper relationships among different data elements and to derive greater value from the data.

Jumpstarting the time-to-value is one of the advantages of the disclosure. Some examples include a roster of customizable device templates for multiple product classes that permit users to quickly reap the benefit of their device telemetry, rapidly going from signal to insights to business transformation. In some examples, the templates include: product and component structure; attribute definition; telemetry to schema mapping; common product measurements, states, and analytics; health dashboards; anomaly detection models; usage metrics and events; and user actions and usage funnels. In addition to device templates, some examples also include component templates, for which predefined component types have templates. Component templates may be used independently of, or in conjunction with, device templates. Exemplary component types are: motor, battery, light, fan, door, button, tire, and blade.

In addition, examples are sufficiently flexible to also allow late-bound mapping with telemetry already ingested. That is, the product classes and components are foundationally extensible, allowing our customers to start with the out-of-the-box value, and extend the templates using their own or third-party improvements. A marketplace thus exists for third-party improvements, which can address semantic schema, component templates, and device templates. This leverages a larger community to expand coverage on the various product classes and components, among other benefits.

Figure 5:
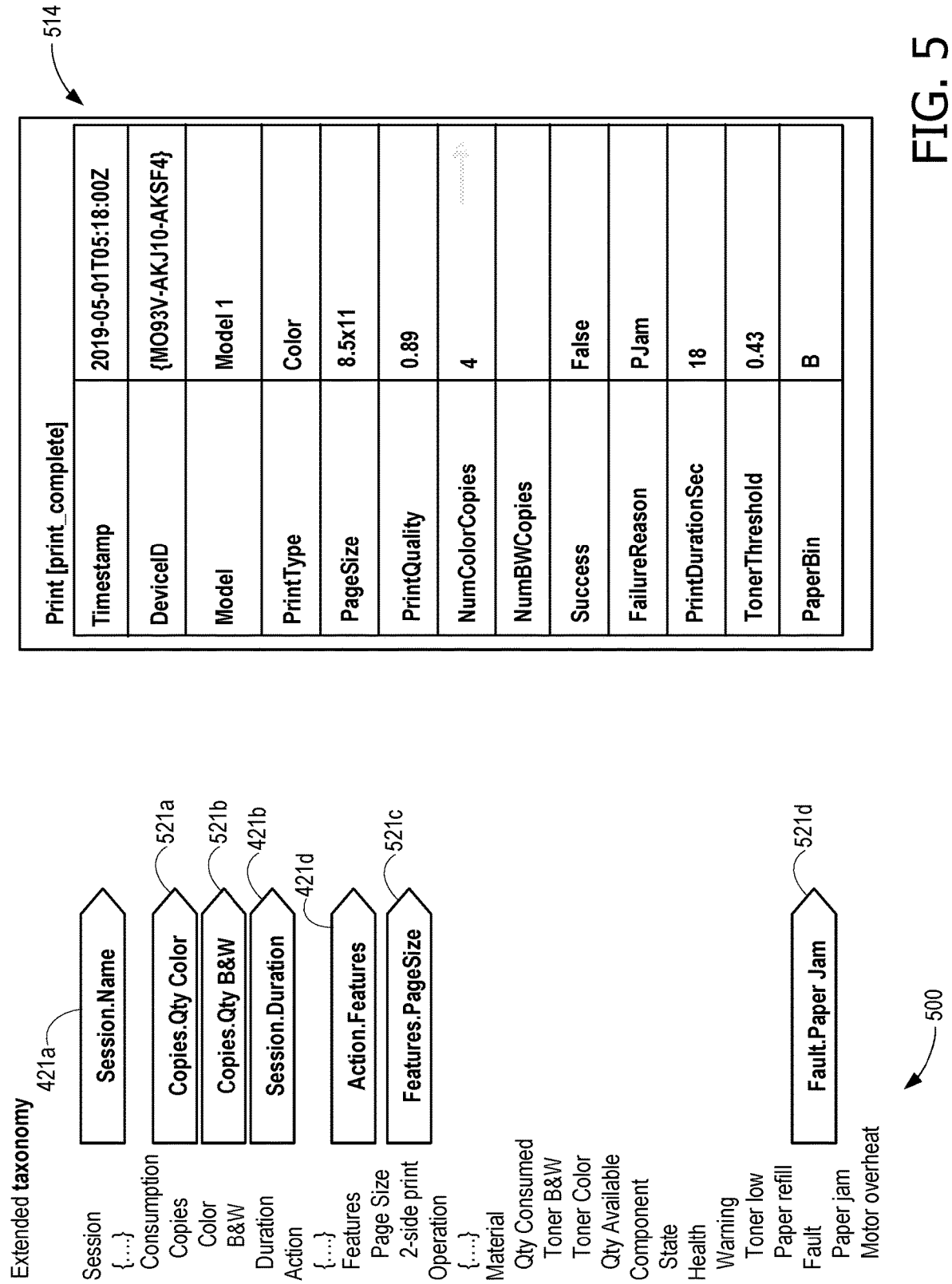
FIG. 5 illustrates another exemplary stage of deriving insight from telemetry data.

FIG. 5 illustrates another exemplary stage of deriving insight from telemetry data, for an extended taxonomy, such as may be provided by a third party (e.g., a device manufacturer) or generated by a user. The extended taxonomy enhances the value of the disclosed solutions, by permitting rapid growth in the schema that is produced by multiple sources. In FIG. 5, a set of core taxonomy tags 421a and 421e is shown, along with a set of extended taxonomy tags 521a-521d with a list of identified properties 514. The example shown in FIG. 5 is a copier. Example insights for appliances such as copiers may include: (1) Active Assets Count: Total Active, By Day of Week, By Time of Day, By Model, Avg time in-use by day; (2) Print Session: Total Print Count, Total Copies Count by Color/B&W, Average Copies During Print, Average Print Duration, Duration by Color/B&W; (3) Print Features: Print by Page Size, Print by PrintType; and (4) Machine Health: Fault Count by Paper Jam, Motor Overheat. In some applications, a component supplier may provide taxonomy information to manufacturers. For example, in the automotive industry, component suppliers may provide taxonomies or schema for electrical, climate control, entertainment subsystems.

FIGS. 6A and 6B illustrate exemplary reports resulting from deriving insight from telemetry data. FIG. 6A shows a sample usage report 600, and FIG. 6B shows a sample health report 605. Various data monitored for devices may include: (1) Usage: Overview, Active Assets, Sessions, Actions, Behavior, Consumption; (2) Performance: Overview, Operations, Components, Material; and (3) Health: Overview, Reliability, Warnings, Faults.

Sample usage report 600 for the first category of data, Usage, includes five data fields 602-610 that relate to usage of coffee machines. Information such as the number and changes of active coffee machines, and the number of different models that are active, is shown in FIG. 6A. For example, data field 602 shows the current count of active machines, and an upward trend, while data field 604 shows the count of active machines over time. Sample health report 650 for the third category of data, Health, includes six data fields 652-662 that also relate to usage of coffee machines. Information regarding the number and types of faults (or failures) is provided that enables a user to identify problem-prone aspects of the monitored devices.

Aspects of the disclosure enable automatic generation of reports, as a result of supplying the tags. Such examples do not require human involvement to generate reports, thereby saving labor and permitting advantageous scaling. In some examples, insights go beyond the boundaries of individually-collected messages, but instead aggregate multiple messages to produce holistic aggregate insights across sensors, products, product categories, and other data groupings.

Figure 7:
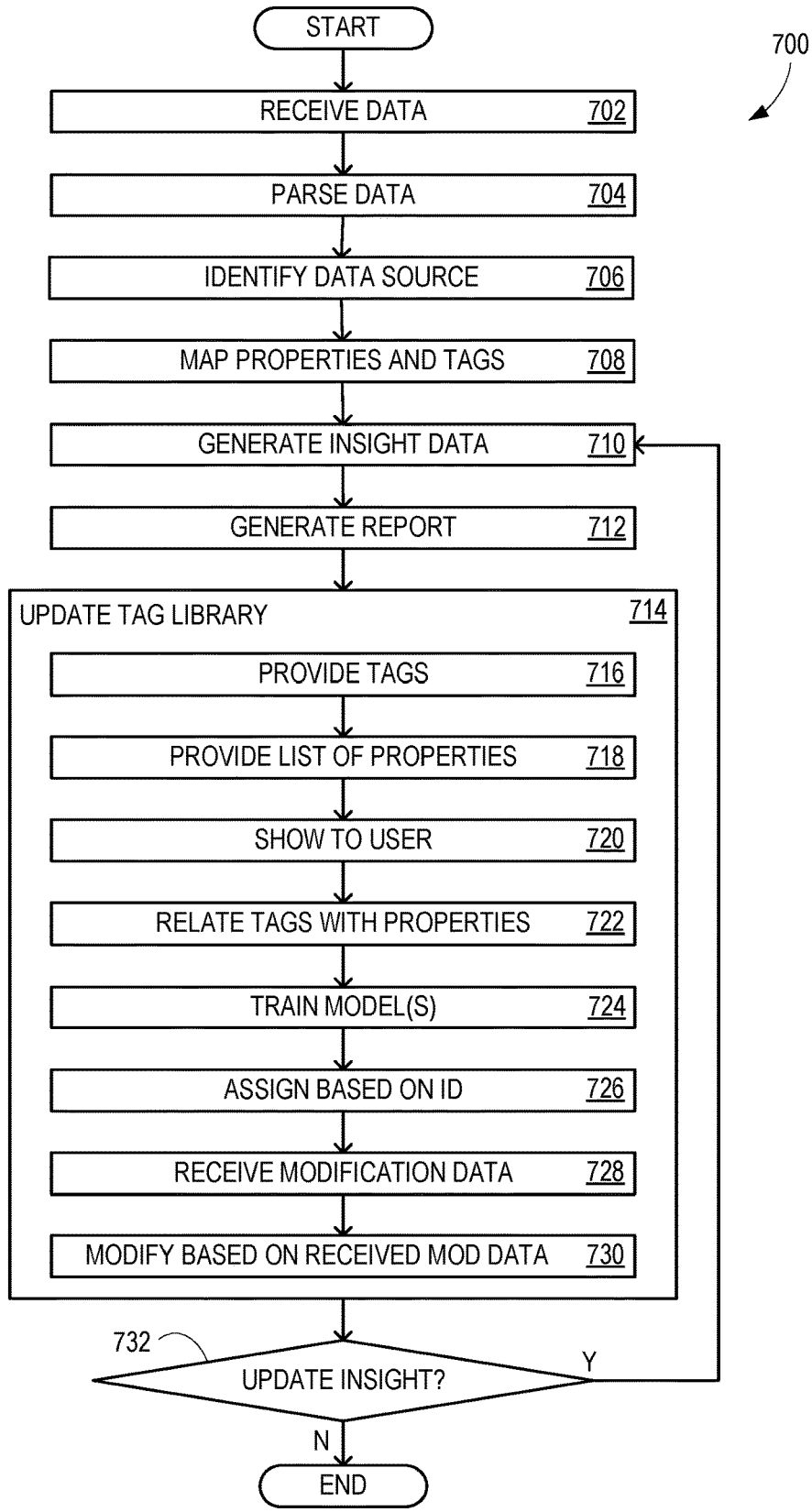
FIG. 7 is a flow chart illustrating exemplary operations involved in deriving insight from telemetry data.

FIG. 7 is a flow chart 700 illustrating exemplary operations involved deriving insight from telemetry data. In some examples, operations described for flow chart 700 are performed by computing device 900 of FIG. 9. Flow chart 700 commences with operation 702, which includes receiving telemetry data. In some examples, the telemetry data comprises sensor data. In some examples, receiving telemetry data comprises receiving a telemetry message. In some examples, receiving telemetry data comprises receiving a telemetry message over a network, wherein the network comprises a wired network or wireless network or both.

Operation 704 includes parsing the received telemetry data to identify properties. Operation 706 includes identifying a source of at least a portion of the telemetry data. In some examples, this occurs during the parsing of operation 704. In some example, the telemetry sender may have already annotated the telemetry data with tags, thereby reducing the level of effort required to generate insights b a monitoring node. This can reduce or eliminate the need for manual tagging. Operation 706 includes mapping the identified properties to a set of identified tags, based at least on a tag library, wherein the tag library comprises predetermined relationships of tags with properties. Operation 710 includes, based at least on the mapping of the identified properties to the set of identified tags, generating first insight data for the telemetry data. In some examples, generating first insight data for the telemetry data comprises generating data relating to usage, performance, or health of a monitored device, arrangement of devices, or service. Operation 712 includes generating a first report of the insight data. In some examples, generating a first report of the insight data comprises outputting at least a portion of the insight data to a dashboard.

The tag library is generated or modified in operation 714, which comprises operations 716-730. Operation 716 includes providing a first list of tags, and operation 718 includes receiving a list of properties. Operation 720 presents at least a portion of the tag library to a user for editing by providing a UI showing the first list of tags and the list of properties. Operation 722 includes relating at least a portion of the first list of tags with at least a portion of the list of properties. In some examples, relating at least a portion of the first list of tags with at least a portion of the list of properties comprises receiving user input assigning at least one tag within the first list of tags to at least one property within the list of properties. In some examples, relating at least a portion of the first list of tags with at least a portion of the list of properties comprises receiving user input assigning at least one tag within the first list of tags to at least one property within the list of properties with drag and drop tagging. In some examples, relating at least a portion of the first list of tags with at least a portion of the list of properties comprises assigning at least one tag within the first list of tags to at least one property within the list of properties with an AI model and/or an ML model. Operation 724 includes training the AI model and/or the ML model using previously determined relationships of tags with properties.

Other alternatives exist for enhancing the tag library. Operation 726 includes assigning at least one tag within the first list of tags to at least one property within the list of properties based at least on identifying the source of at least a portion of the telemetry data. The source of at least a portion of the telemetry data was identified in operation 706. Operation 728 includes receiving a modification data for the tag library, such as a third party-produced taxonomy, as was described in relation to FIG. 5. Operation 730 includes modifying the tag library, based at least on the modification data for the tag library.

Some examples automatically update the insights, based on modifications to the lag library. Decision operation 732 thus determines whether flow chart 700 returns to operation 710. If so, the pass through operations 710 and 712 include, based at least on modifying the tag library, generating second insight data for the telemetry data; and generating a second report of the second insight data, respectively.

Figure 8:
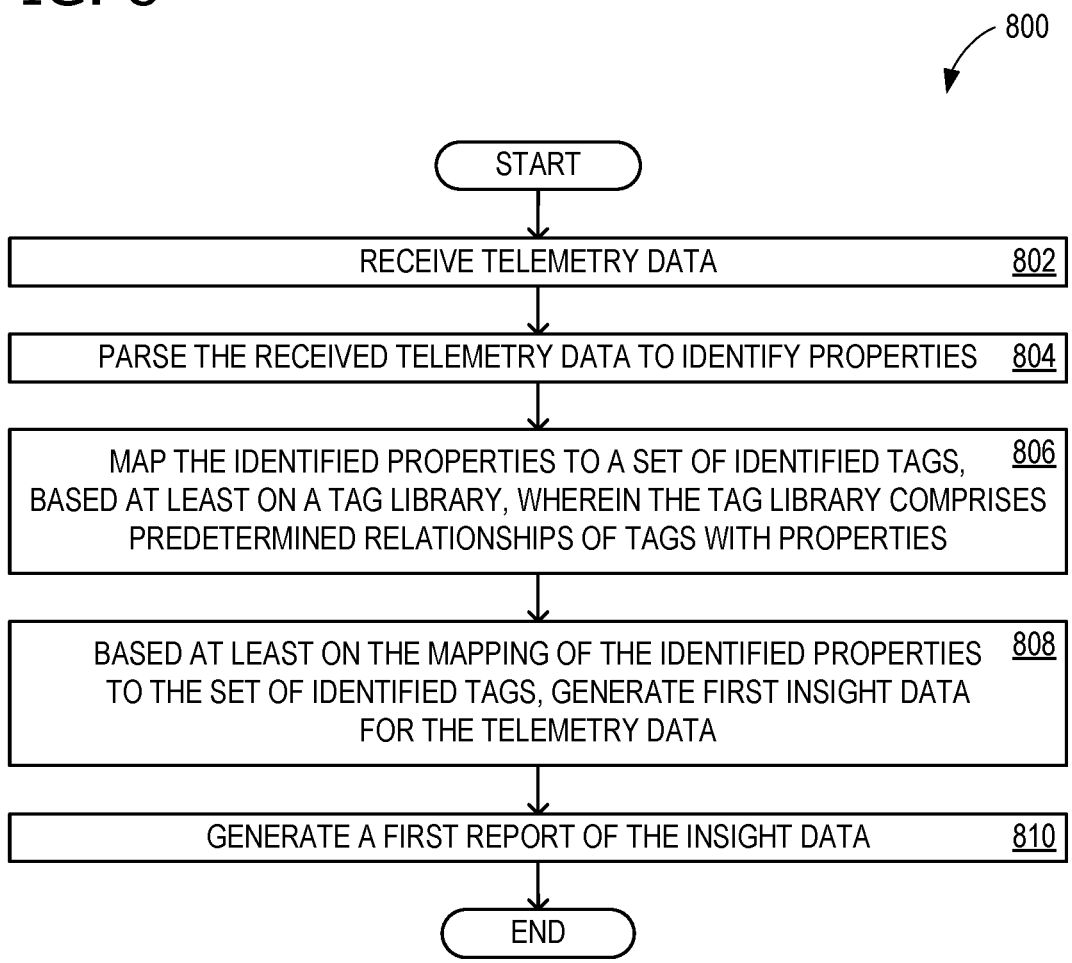
FIG. 8 is another flow chart illustrating exemplary operations involved in deriving insight from telemetry data.

FIG. 8 is a flow chart 800 illustrating exemplary operations involved in deriving insight from telemetry data. In some examples, operations described for flow chart 800 are performed by computing device 900 of FIG. 9. Flow chart 800 commences with operation 802, which includes receiving telemetry data. In some examples, receiving telemetry data comprises receiving a telemetry message. In some examples, receiving the telemetry message comprises receiving the telemetry message over a network, such as a wired network, a wireless network, or both. Thus, in some examples, receiving telemetry data comprises receiving a telemetry message over a network. In some examples, the telemetry data comprises sensor data.

Operation 804 includes parsing the received telemetry data to identify properties. Operation 806 includes mapping the identified properties to a set of identified tags, based at least on a tag library, wherein the tag library comprises predetermined relationships of tags with properties. Operation 808 includes based at least on the mapping of the identified properties to the set of identified tags, generating first insight data for the telemetry data. In some examples, generating first insight data for the telemetry data comprises generating data relating to usage, performance, or health of a monitored device, arrangement of devices, or service. Operation 810 includes generating a first report of the insight data. In some examples, generating a first report of the insight data comprises outputting at least a portion of the insight data to a dashboard.

ADDITIONAL EXAMPLES

Some aspects and examples disclosed herein are directed to a system for deriving insight from telemetry data comprising: a processor; and a computer-readable medium storing instructions that are operative upon execution by the processor to: receive telemetry data; parse the received telemetry data to identify properties; map the identified properties to a set of identified tags, based at least on a tag library, wherein the tag library comprises predetermined relationships of tags with properties; based at least on the mapping of the identified properties to the set of identified tags, generate first insight data for the telemetry data; and generate a first report of the insight data.

Additional aspects and examples disclosed herein are directed to a system for deriving insight from telemetry data comprising: a set of sensors operable to monitor a device, arrangement of devices, or service; a network communicatively coupled to the set of sensors; and a first monitoring node communicatively coupled to the network, the first monitoring node operable to: receive telemetry data from the set of sensors; parse the received telemetry data to identify properties; map the identified properties to a set of identified tags, based at least on a tag library, wherein the tag library comprises predetermined relationships of tags with properties; based at least on the mapping of the identified properties to the set of identified tags, generate first insight data for the telemetry data; and generate a first report of the insight data.

Additional aspects and examples disclosed herein are directed to a method of deriving insight from telemetry data comprising: receiving telemetry data; parsing the received telemetry data to identify properties; mapping the identified properties to a set of identified tags, based at least on a tag library, wherein the tag library comprises predetermined relationships of tags with properties; based at least on the mapping of the identified properties to the set of identified tags, generating first insight data for the telemetry data; and generating a first report of the insight data.

Additional aspects and examples disclosed herein are directed to one or more computer storage devices having computer-executable instructions stored thereon for deriving insight from telemetry data, which, on execution by a computer, cause the computer to perform operations comprising: receiving telemetry data; parsing the received telemetry data to identify properties; mapping the identified properties to a set of identified tags, based at least on a tag library, wherein the tag library comprises predetermined relationships of tags with properties; based at least on the set of identified tags, generating first insight data for the telemetry data; and generating a first report of the insight data.

Alternatively, or in addition to the other examples described herein, examples include any combination of the following:

- receiving telemetry data comprises receiving a telemetry message;
- receiving the telemetry message comprises receiving the telemetry message over a network;
- the network comprises a wired network or wireless network or both;
- the telemetry data comprises sensor data;
- generating or modifying the tag library;
- generating or modifying the tag library comprises providing a first list of tags;
- generating or modifying the tag library comprises receiving a list of properties;
- generating or modifying the tag library comprises relating at least a portion of the first list of tags with at least a portion of the list of properties;
- providing a UI showing the first list of tags and the list of properties;
- relating at least a portion of the first list of tags with at least a portion of the list of properties comprises receiving user input assigning at least one tag within the first list of tags to at least one property within the list of properties with drag and drop tagging;
- relating at least a portion of the first list of tags with at least a portion of the list of properties comprises assigning at least one tag within the first list of tags to at least one property within the list of properties with an AI model;
- generating or modifying the tag library further comprises training the AI model using previously determined relationships of tags with properties;
- based at least on modifying the tag library, generating second insight data for the telemetry data;
- generating a second report of the second insight data;
- identifying a source of at least a portion of the telemetry data;
- generating or modifying the tag library comprises assigning at least one tag within the first list of tags to at least one property within the list of properties based at least on identifying the source of at least a portion of the telemetry data;
- generating first insight data for the telemetry data comprises generating data relating to usage, performance, or health of a monitored device, arrangement of devices, or service;
- generating a first report of the insight data comprises outputting at least a portion of the insight data to a dashboard;
- a second monitoring node communicatively coupled to the first monitoring node, the second monitoring node operable to receive the first report and generate a dashboard display, based at least on the first report;
- the first monitoring node is further operable to receive a modification data for the tag library;
- the first monitoring node is further operable to modify the tag library, based at least on the modification data for the tag library;
- the first monitoring node is further operable to, based at least on modifying the tag library, generate second insight data for the telemetry data; and
- the first monitoring node is further operable to generate a second report of the second insight data.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
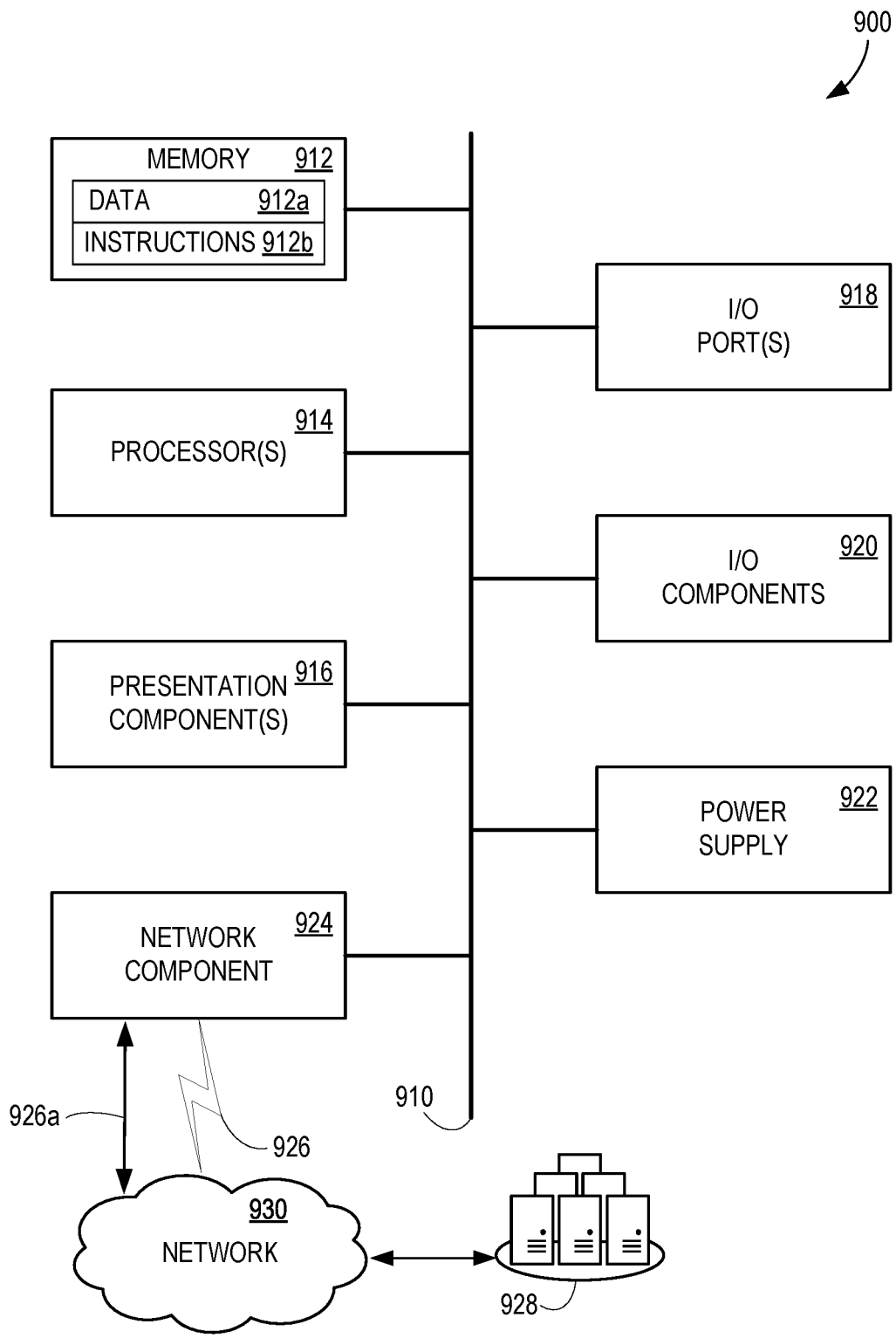
FIG. 9 is a block diagram of an example computing environment suitable for implementing some of the various examples disclosed herein.

FIG. 9 is a block diagram of an example computing device 900 for implementing aspects disclosed herein, and is designated generally as computing device 900. Computing device 900 is but one example of a suitable computing environment and is not intended to suggest any limitation as to the scope of use or functionality of the examples disclosed herein. Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer-storage memory 912, one or more processors 914, one or more presentation components 916, I/O ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer-storage media references below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer-storage media in the form of volatile and/or nonvolatile memory, removable or non-removable memory, data disks in virtual environments, or a combination thereof. Memory 912 may include any quantity of memory associated with or accessible by the computing device 900. Memory 912 may be internal to the computing device 900 (as shown in FIG. 9), external to the computing device 900 (not shown), or both (not shown). Examples of memory 912 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 900. Additionally, or alternatively, the memory 912 may be distributed across multiple computing devices 900, for example, in a virtualized environment in which instruction processing is carried out on multiple devices 900. For the purposes of this disclosure, "computer storage media," "computer-storage memory," "memory," and "memory devices" are synonymous terms for the computer-storage memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

The computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a cloud resource 928 across network 930. Various different examples of communication links 926 and 926a include a wireless connection, a wired connection, and/or a dedicated link, and in some examples, at least a portion is routed through the internet.

In some examples, the computing apparatus detects voice input, user gestures or other user actions and provides a natural user interface (NUI). This user input may be used to author electronic ink, view content, select ink controls, play videos with electronic ink overlays and for other purposes. The input/output component outputs data to devices other than a display device in some examples, e.g. a locally connected printing device. NUI technology enables a user to interact with the computing apparatus in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a computer-readable medium storing instructions that, when executed by the processor, are operative to:
receive telemetry data for at least one of a product or a service;
identify a property of the at least one of the product or service from the received telemetry data;
generate insight data for the telemetry data using a template, the template comprising a mapping between the identified property and a tag, the mapping being based on a tag library that comprises relationships of tags with properties; and
generate a report of the insight data.

2. The system of claim 1, wherein the template comprises one or more of: product and component structure; attribute definition; telemetry to schema mapping; common product measurements, states, and analytics; health dashboards; anomaly detection models; usage metrics and events; user actions and usage funnels.

3. The system of claim 1, wherein the template comprises a device template for a product class.

4. The system of claim 1, wherein the template comprises a component template for a component type comprising one or more of: motor, battery, light, fan, door, button, tire, blade.

5. The system of claim 1, wherein the template enables late-bound mapping with telemetry data already ingested.

6. The system of claim 1, wherein the instructions are further operative to customize the template, and wherein the instructions are operative to generate the insight data using the customized template.

7. The system of claim 1, wherein the instructions are further operative to display on a user interface at least one of a sample usage report or a sample health report.

8. The system of claim 1, wherein the telemetry data comprises sensor data.

9. The system of claim 1, wherein the instructions are operative to generate the insight data including data relating to one or more of usage, performance, health of one or more of a monitored device, arrangement of devices, service.

10. A computerized method comprising:
receiving telemetry data;
identifying a property from the received telemetry data;
generating, by a processor, insight data for the telemetry data using a template, the template comprising a mapping between the identified property and a tag, the mapping being based on a tag library that comprises relationships of tags with properties, the insight data relating to one or more of usage, performance, health of one or more of a monitored device, an arrangement of devices, a service; and
generating, by the processor, a report of the insight data.

11. The computerized method of claim 10, wherein the template comprises one or more of: product and component structure; attribute definition; telemetry to schema mapping; common product measurements, states, and analytics; health dashboards; anomaly detection models; usage metrics and events; user actions and usage funnels.

12. The computerized method of claim 10, wherein the template comprises at least one of a device template for a product class or a component template for a component type.

13. The computerized method of claim 10, wherein the template enables late-bound mapping with telemetry data already ingested.

14. The computerized method of claim 10, further comprising customizing the template, wherein generating the insight data comprises generating the insight data using the customized template.

15. The computerized method of claim 10, further comprising displaying on a user interface at least one of a sample usage report or a sample health report.

16. The computerized method of claim 10, wherein generating the insight data comprises generating data relating to one or more of usage, performance, health of one or more of a monitored device, arrangement of devices, service.

17. A computer storage device having computer-executable instructions stored thereon, which, upon execution by a computer, cause the computer to perform operations comprising:

receiving telemetry data for at least one of a product or a service;

identifying a property of the at least one of a product or service from the received telemetry data;

customizing a template that includes a mapping between the identified property and a tag, the mapping being based on a tag library that comprises relationships of tags with properties;

generating insight data for the telemetry data using the customized template; and generating a report of the insight data.

18. The computer storage device of claim 17, wherein customizing the template comprises customizing one or more of: semantic schema, a component template, a device template.

19. The computer storage device of claim 17, wherein customizing the template comprises extending a set of core taxonomy tags.

20. The computer storage device of claim 17, wherein generating the insight data comprises generating data relating to one or more of usage, performance, health of one or more of a monitored device, arrangement of devices, service.

* * * * *